(12) United States Patent
Han

(10) Patent No.: US 7,219,707 B2
(45) Date of Patent: May 22, 2007

(54) ENHANCED HOLLOW FOAM TIRE STRUCTURE

(76) Inventor: Wen-Yao Han, No. 35, Meinan St., South District, Tainan City 702 (TW)

(*) Notice: Subject to any disclaimer, the term of this patent is extended or adjusted under 35 U.S.C. 154(b) by 185 days.

(21) Appl. No.: 10/912,643

(22) Filed: Aug. 5, 2004

(65) Prior Publication Data
US 2006/0027298 A1 Feb. 9, 2006

(51) Int. Cl.
*B60B 3/08* (2006.01)
*B60C 7/24* (2006.01)

(52) U.S. Cl. ............... 152/384; 152/246; 152/312; 152/316; 301/64.303

(58) Field of Classification Search ........... 301/64.301, 301/64.303; 152/5, 7, 246, 310, 311, 312, 152/313, 316, 384, 396
See application file for complete search history.

(56) References Cited

U.S. PATENT DOCUMENTS

| | | | | |
|---|---|---|---|---|
| 663,899 A * | 12/1900 | Holmes | ...... | 152/388 |
| 1,215,577 A * | 2/1917 | Reeder | ...... | 152/320 |
| 1,299,051 A * | 4/1919 | Sprague | ...... | 152/312 |
| 1,436,146 A * | 11/1922 | Braden | ...... | 152/310 |
| 1,506,411 A * | 8/1924 | Cowgill | ...... | 152/320 |
| 1,549,668 A * | 8/1925 | Johnson | ...... | 152/316 |
| 1,557,972 A * | 10/1925 | Bostwick | ...... | 152/315 |
| 1,825,502 A * | 9/1931 | Braga | ...... | 152/320 |
| 3,397,728 A * | 8/1968 | McCrary et al. | ...... | 152/158 |
| 3,646,983 A * | 3/1972 | Van Lieshoud | ...... | 152/323 |
| 3,827,792 A * | 8/1974 | Hollins | ...... | 152/319 |
| 3,901,300 A * | 8/1975 | Toplis | ...... | 152/246 |
| 3,977,727 A * | 8/1976 | Glasenapp et al. | ...... | 152/384 |
| 4,216,810 A | 8/1980 | Osada et al. | ...... | 152/158 |
| 4,909,972 A * | 3/1990 | Britz | ...... | 264/51 |
| 5,073,444 A * | 12/1991 | Shanelec | ...... | 428/313.5 |
| 6,401,773 B1* | 6/2002 | Cho | ...... | 152/158 |
| 6,568,443 B2* | 5/2003 | Shoner | ...... | 152/157 |
| 6,901,981 B2* | 6/2005 | Wu | ...... | 152/157 |
| 2004/0070261 A1* | 4/2004 | Han | ...... | 301/64.201 |
| 2004/0182489 A1* | 9/2004 | Chen | ...... | 152/383 |

FOREIGN PATENT DOCUMENTS

FR 2828834 * 2/2006

* cited by examiner

*Primary Examiner*—Russell D. Stormer
(74) *Attorney, Agent, or Firm*—C. G. Mersereau; Nikolai & Mersereau, P.A.

(57) ABSTRACT

A hollow EVA foam tire structure includes a tire, a core and a rim. The core includes a plurality of sections substantially arranged into an annular shape and being hollow on both sides. A plurality of protruding block sections is disposed on the internal side of the flange section of the core extended from the accommodating space of the tire, and both sides of the tire are covered by the rim having two corresponding external flange surfaces at the external sides. Pointed splinters are disposed on the external flange surface and protruding block sections are protruded from the rim. Thus, the protruding block sections of the wheel core are alternatively and mutually engaged. Therefore, when the two corresponding rims are securely coupled, the pointed splinters of the rim can be pierced and fixed into the tire, and the internal side of the tire is embedded into the hollow section of the wheel core by a compressing force. Therefore, the tire, the wheel core and the two side rims can be coupled more securely so as to enhance the carrying capacity of the tire by the wheel core.

8 Claims, 4 Drawing Sheets

ENHANCED HOLLOW FOAM TIRE STRUCTURE

FIELD OF THE INVENTION

The present invention relates to hollow ethylene-vinyl acetate (EVA) foam tires having an enhanced wheel core and a rim for being clamped on both sides, such that the three parts can be connected more securely as to enhance the loading capacity of the tire.

BACKGROUND OF THE INVENTION

In general, a solid tire made of ethylene-vinyl acetate (EVA) foam material is commonly used for vehicles carrying less load and having no absorber but demanding a good shockproof function, because such tire has the features of low cost, easy manufacturing and outstanding elasticity. Although the tire of this kind is solid, the carrying capacity is still insufficient due to its manufacturing material. However, U.S. Pat. No. 4,216,810 disclosed a tire structure which comprises a plurality of annularly disposed circular protector elements keeping an appropriate distance from the inner wall of the wire and a flange being accommodated precisely between both inboard sides of the tire. When the inboard rim and the outboard rim are engaged, the corresponding flanges of the two rims are clamped, and thus, the protector elements can be mounted into the tire. However, the main purpose of the protector element is to support a vehicle by the protector elements in a tire particularly when the tire is punctured. Thus, when the flat tire is pressed and in contact with the ground, the tire and the rim will not be in direct contact, and the vehicle can continue its traveling without damaging the tire and the rim. Such arrangement allows a flat tire to travel more stably without skids.

Although a pneumatic tire with this structure has better elasticity and cushioning effect, its carrying capacity is still very limited. Furthermore, the pneumatic tire also has the risk of being punctured and flattened.

SUMMARY OF THE INVENTION

It is therefore a primary objective of the present invention to overcome the condition of maintaining a good elastic and loading capability of a tire without air inflation. The tire according to the present invention is made of EVA materials and substantially hollow, and the tire comprises a wheel core in an annular shape formed by a plurality of separate sections and a rim clamped on both sides of the tire. In addition to strengthening the structure of the EVA tire, the present invention also enhances its loading capacity and also maintains an excellent elasticity.

Further, a protruded section disposed on the two corresponding inboard sides of the foregoing rim and the sides of the wheel core are substantially hollow, such that the tire can engage the rim and wheel cores better as to further prevent the EVA foam tire from skidding.

According to the technical measures adopted by the present invention to achieve the foregoing objectives, the hollow foam tire installs a hollow wheel core on the side of the tire in advance. The wheel core of an annular shape includes a plurality of sections, and both sides of the tire are clamped by the rim. A pointed splinter disposed on the surface where the rim and tire are in contact with each other is pierced into the tire, and protruding block sections for corresponding and engaging with each other are disposed on the internal surface of the wheel core and the surface corresponding to the flange section of the two rims.

The invention can be fully understood by the following description accompanied with the drawings of a preferred embodiment of the present invention.

DETAILED DESCRIPTION OF THE PREFERRED EMBODIMENTS

Figure 1:
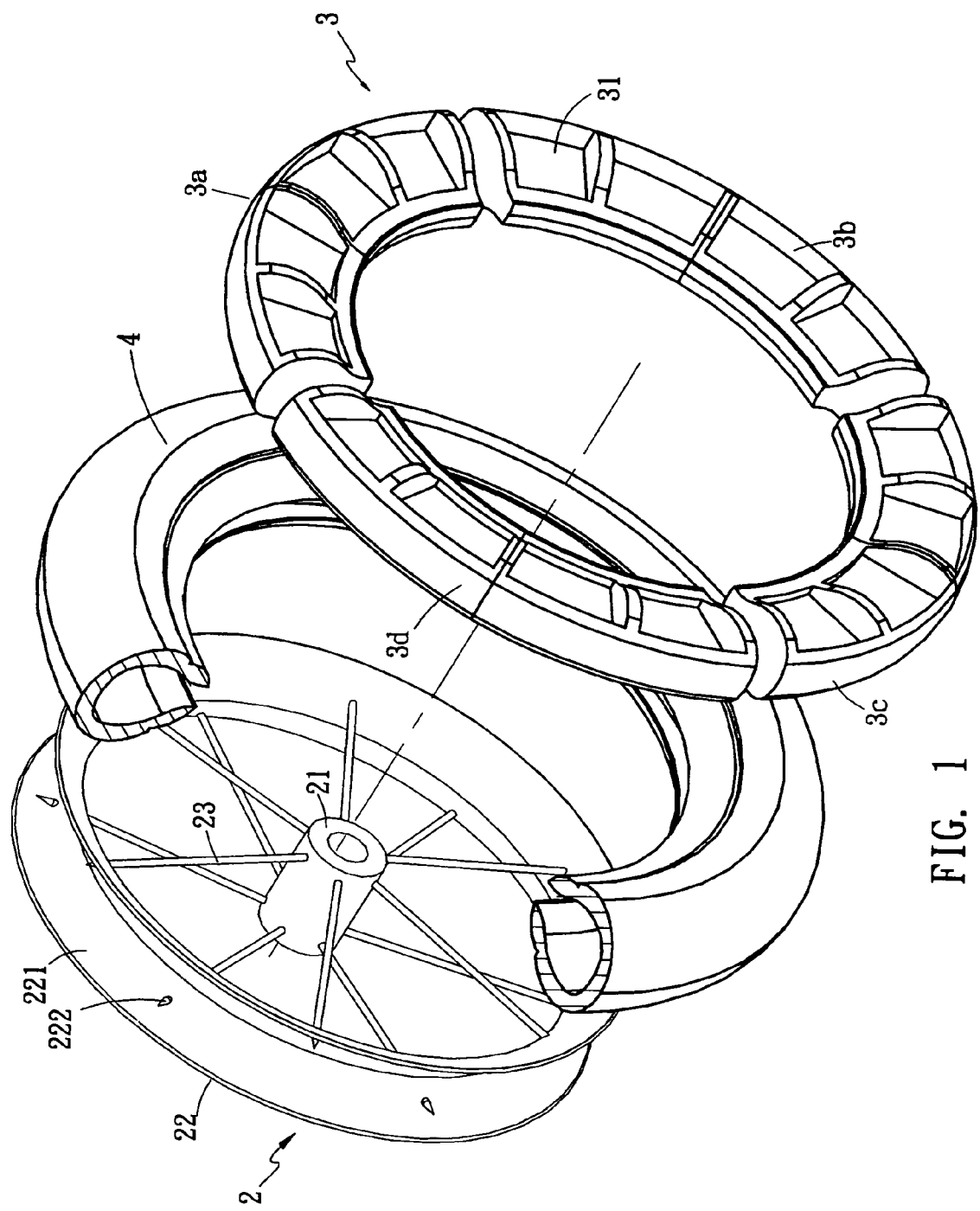
FIG. 1 is an exploded view of a first preferred embodiment of the present invention.
Figure 2:
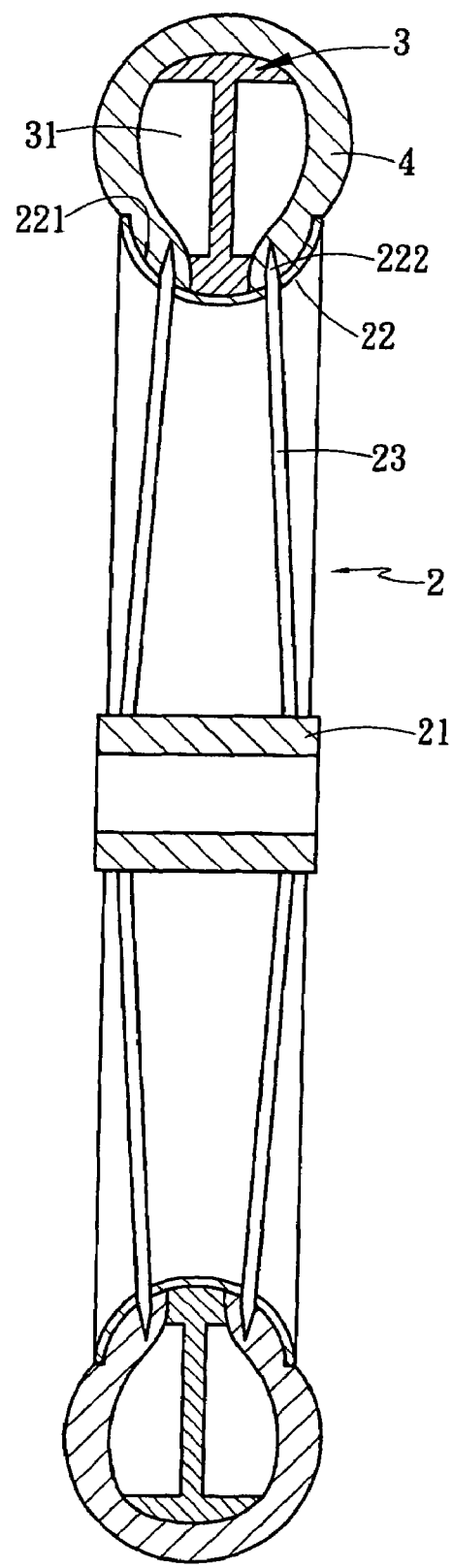
FIG. 2 is a cross-sectional view of a first preferred embodiment of the present invention.

Please refer to FIGS. 1 and 2 for the present invention. In the figures, a wheel rim 2 of the foam tire comprises a plurality of spokes 23 connected between a hub 21 and a rim 22. A plurality of pointed splinters 222 are evenly disposed on the concave surface 221 of the rim 22. A wheel core 3 is formed by a plurality of separate sections 3a, 3b, 3c, 3d. A hollow section 31 is alternatively disposed on both sides of each separate section 3a, 3b, 3c, 3d, and each separate section 3a, 3b, 3c, 3d is pre-installed into a hollow foam tire 4. The tire 4 together with the wheel core 3 are sheathed onto the rim 22 of the wheel rim 2 as to pierce each pointed splinter 222 into the tire 4 and fix the tire 4 into place. Thus, skids between the wheel rim 2 and the tire 4 are prevented. Furthermore, the hollow tire 4 wraps the wheel core 3, and, thus, the foam tire can carry heavier loads.

Figure 3:
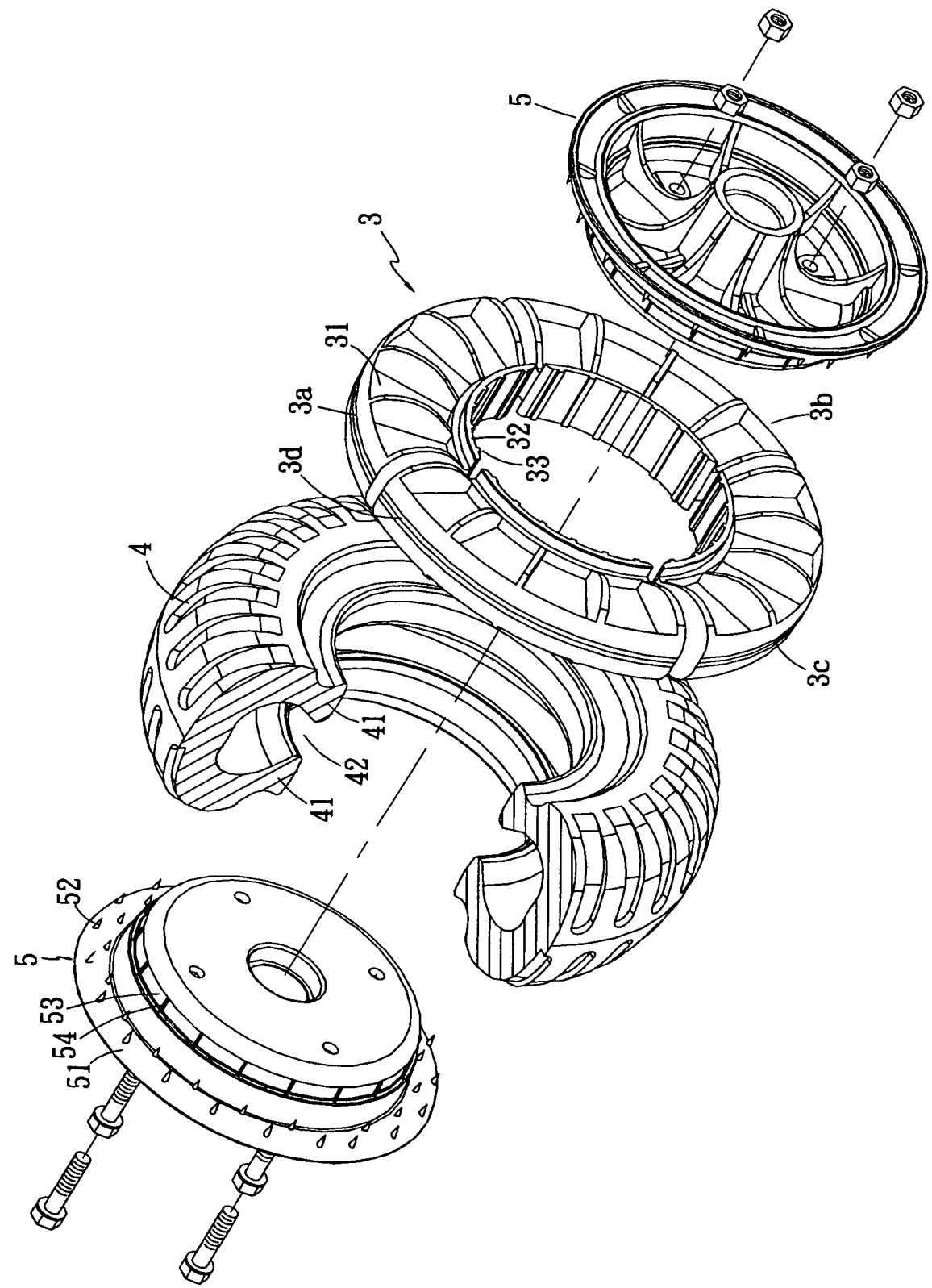
FIG. 3 is an exploded view of a second preferred embodiment of the present invention.
Figure 4:
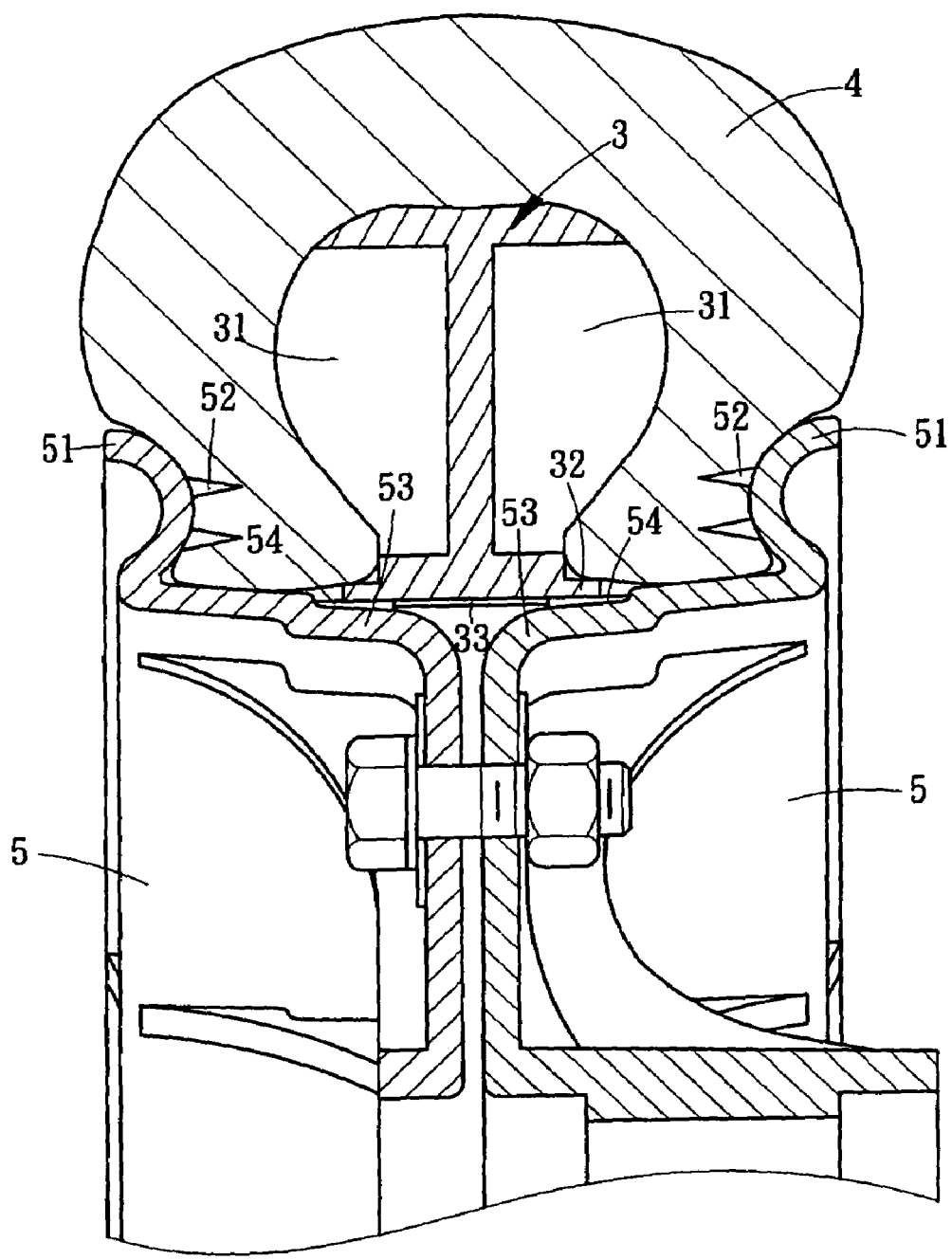
FIG. 4 is a cross-sectional view of a second preferred embodiment of the present invention.

Please refer to FIGS. 3 and 4 for another preferred embodiment of the present invention. The wheel rim 5 of the foam tire is comprised of two corresponding rims 5 engaged with each other by screws. A wheel core 3 includes a plurality of separate sections 3a, 3b, 3c, 3d disposed between the two rims 5 and aligned in a circular shape. A tire 4 is clamped and fixed between the two rims 5 and the wheel core 3.

The tire 4, substantially has a design in a hollow shape with two corresponding internal flange sections 41 disposed on the internal sides of the tire 4 and an accommodating space 42 defined between the two internal flange sections 41.

A wheel core 3 includes a plurality of separate sections 3a, 3b, 3c, 3d aligned in a circular shape. A hollow section 31 is disposed on the intervals between separate sections 3a, 3b, 3c, 3d. A wider flange section 32 or internal head is disposed on the internal side on both sides of each separate section 3a, 3b, 3c, 3d. A plurality of protruding block sections 33 is disposed at intervals on the internal, cylindrical surface of the flange section 32.

Two corresponding wheel rims 5 are installed on both sides of the tire 4. Besides having an axle hole (not labeled in the figure) for passing a wheel axle through, the external side of each wheel rim 5 also has a convexly curved flange surface 51. A plurality of pointed splinters 52 is disposed on the flange surface 51. A flange end 53 is disposed on the internal sides of the rim 5. A plurality of protruding block sections 54 is disposed at intervals on the external surrounding surface of the flange end 53.

The wheel core 3 including separate sections 3a, 3b, 3c, 3d is preinstalled into the hollow tire 4, and the two corresponding rims 5 are installed onto both internal sides of the tire 4. The two corresponding rims 5 are coupled together by screws, so that the flange ends 53 of the two rims 5 are extended into the foam tire 4 and so that the external flange surface 51 of the rim 5 is attached onto the external side of the internal flange section 41 of the foam tire 4. The accommodating space 42 disposed between two internal flange sections 41 of the foam tire 4 precisely locates the lower neck section of every separate section 3a, 3b, 3c, 3d of the wheel core 3. Also, the flange section 32 of each separate section 3a, 3b, 3c, 3d is extended onto the flange end 53 of the rim 5, so that the internal, cylindrical surface of the flange section 32 is pressed against the wheel rim. Thus, the corresponding protruding block sections 33, 54 between the two are engaged alternately. Therefore, the two corresponding rims 5 secured by screws are moved inwardly as to clamp the internal flange section 41 of the foam tire 4 between the external flange surface 51 of the rim 5 and the wheel core 3. Further, each pointed splinter 52 of the external flange surface 51 of the rim 5 will pierce into the foam tire 4. The internal flange section 41 of the foam tire 4 will be embedded into the hollow hole 31 on the side of each separate section 3a, 3b, 3c, 3d at the contact position of the internal flange section 41 of the foam tire 4 and the side of each separate section 3a, 3b, 3c, 3d when the flange section 41 is pressed. Therefore, the foam tire 4 is clamped, fixed, and also positioned by engaging the pointed splinters 52 and the hollow sections 31, 50 that the foam tire 4, the rim 5, and each separate section 3a, 3b, 3c, 3d (of the wheel core 3) will not skid at all. Also, since the protruding block sections 54 on the surface of the curved flange ends 53 of the rim 5 and the protruding block sections 33 on the internal sides of each separate section 3a,3b, 3c, 3d are coupled alternately for the positioning effect, there is a slippery-proof effect between the rim 5 and the wheel core 3. Thus, the design according to the present invention separates the wheel core 3 from the rim 5 instead of directly forming the wheel core 3 onto the rim 5, which saves the cost of the molding and the trouble of the operation, and also allows users to freely assemble or remove the rim 5, the tire 4 or the wheel core 3, which provides a more flexible way of installing or removing any parts for the maintenance.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An enhanced hollow foam tire structure, comprising:
   a tire having an internal wall;
   a wheel rim having a plurality of pointed splinters evenly disposed on a concave surface and in contact with the tire mounted on the wheel rim;
   a wheel core including a plurality of separate sections aligned in a circular shape, and an external top surface of said wheel core pressing radially outward of the wheel rim against the internal wall of said tire, with said pointed splinters disposed on the concave surface of said wheel rim piercing into said tire for preventing said tire from skidding, with an internal bottom surface of said wheel core pressing against the wheel rim, with sides of the wheel core intermediate the external top surface and the internal bottom surface including depressions which with the internal wall of the tire define hollow sections, wherein said wheel rim includes two corresponding half rims engaged with each other; said wheel rim comprises protruding block sections disposed on said wheel rim; and
   protruding block sections protruded from the internal bottom surface of said wheel core, such that said protruding block sections of the wheel rim and the wheel core are engaged alternately with each other between said wheel rim and each said separate section, wherein the concave surface includes convex sides, with the pointed splinters extending from the convex sides.

2. The enhanced hollow foam tire structure of claim 1, wherein the wheel core has I-shaped cross sections having an external head, an internal head, and an interconnecting member extending between the external head and the internal head, with the external head including the external top surface and the internal head including the internal bottom surface, and with the depressions located on opposite sides of the interconnecting member intermediate the external head and the internal head.

3. The enhanced hollow foam tire structure of claim 2, wherein the tire includes an accommodating space defined between two internal flange sections, with the wheel core received in the accommodating space, with the internal head including an internal top surface opposite to the internal bottom surface, with the internal top surface defining the depressions, with outer corners of the internal top surface being notched to receive the two internal flange sections of the tire.

4. The enhanced hollow foam tire structure of claim 3, wherein the internal bottom surface is cylindrical and has an extent greater than an axial extent of the interconnecting member.

5. The enhanced hollow foam tire structure of claim 2, wherein the internal bottom surface is cylindrical and has an extent greater than an axial extent of the interconnecting member.

6. An enhanced hollow foam tire structure, comprising:
   a tire having an internal wall;
   a wheel rim having a plurality of pointed splinters evenly disposed on a concave surface and in contact with the tire mounted on the wheel rim; and
   a wheel core including a plurality of separate sections aligned in a circular shape, and an external top surface of said wheel core pressing radially outward of the wheel rim against the internal wall of said tire, with said pointed splinters disposed on the concave surface of said wheel rim piercing into said tire for preventing said tire from skidding, with an internal bottom surface of said wheel core pressing against the concave surface of the wheel rim, with sides of the wheel core intermediate the external top surface and the internal bottom surface including depressions which with the internal wall of the tire define hollow sections, wherein the wheel rim includes a plurality of spokes, with the plurality of pointed splinters integrally formed on ends of the plurality of spokes extending through the concave surface.

7. The enhanced hollow foam tire structure of claim 6, wherein the wheel core has I-shaped cross sections having an external head, an internal head, and an interconnecting member extending between the external head and the internal head, with the external head including the external top surface and the internal head including the internal bottom surface, and with the depressions located on opposite sides of the interconnecting member intermediate the external head and the internal head.

8. The enhanced hollow foam tire structure of claim 7, wherein the internal bottom surface is cylindrical and has an extent greater than an axial extent of the interconnecting member.

* * * * *